US010369641B2

(12) United States Patent
Myers et al.

(10) Patent No.: US 10,369,641 B2
(45) Date of Patent: Aug. 6, 2019

(54) COMBINED BLADE CLAMP AND TENSIONER FOR SCROLL SAW

(71) Applicant: JPW Industries Inc., LaVergne, TN (US)

(72) Inventors: Steven Myers, Buffalo Valley, TN (US); Charles Weber, Onalaska, WI (US)

(73) Assignee: JPW Industries Inc., LaVergne, TN (US)

( * ) Notice: Subject to any disclaimer, the term of this patent is extended or adjusted under 35 U.S.C. 154(b) by 238 days.

(21) Appl. No.: 15/472,472

(22) Filed: Mar. 29, 2017

(65) Prior Publication Data
US 2017/0304915 A1    Oct. 26, 2017

Related U.S. Application Data

(60) Provisional application No. 62/325,165, filed on Apr. 20, 2016.

(51) Int. Cl.
B23D 51/12    (2006.01)
B23D 51/14    (2006.01)
B23D 59/00    (2006.01)
B23D 49/00    (2006.01)

(52) U.S. Cl.
CPC ......... B23D 51/125 (2013.01); B23D 49/007 (2013.01); B23D 51/14 (2013.01); B23D 59/006 (2013.01)

(58) Field of Classification Search
CPC .... B23D 51/125; B23D 49/007; B23D 51/14; B23D 59/006
See application file for complete search history.

(56) References Cited

U.S. PATENT DOCUMENTS 5,016,512 A * 5/1991 Huang ................... B23D 51/14
                                                    83/581.1
5,327,807 A * 7/1994 Chang .................. B23D 51/125
                                                    83/581.1
5,661,909 A * 9/1997 Kondo ................... B23D 51/10
                                                    279/53

(Continued)

FOREIGN PATENT DOCUMENTS

FR    2770163 A1    4/1999

OTHER PUBLICATIONS

Extended European Search Report, dated Aug. 17, 2017.

Primary Examiner — Kenneth E Peterson
Assistant Examiner — Liang Dong
(74) Attorney, Agent, or Firm — Waller Lansden Dortch & Davis, LLP; Blake M. Bernard

(57) ABSTRACT

A blade clamp with first and second gripping members configured to hold a cutting blade, a lever connected to the clamp by a connection member, and a head that receives the connection member that extends through an aperture of the head. The connection member can move along a first axis through the aperture of the head and move the clamp along the first axis based on a position of the lever. The first and the second gripping members of the clamp can clamp the cutting blade along a second axis orthogonal to the first axis based on a position of the clamp along the first axis. The lever can include an eccentric cam surface that engages a cam follower. The eccentric cam surface can cause the clamp to provide a clamping force and tension to the cutting blade.

18 Claims, 7 Drawing Sheets

(56) References Cited

U.S. PATENT DOCUMENTS

| | | | |
|---|---|---|---|
| 5,941,153 A | 8/1999 | Chang | |
| 6,530,579 B1 * | 3/2003 | Houben | B23D 51/08 279/30 |
| 2007/0266838 A1 * | 11/2007 | Chen | B23D 51/14 83/699.21 |
| 2016/0045963 A1 | 2/2016 | Chang | |

* cited by examiner

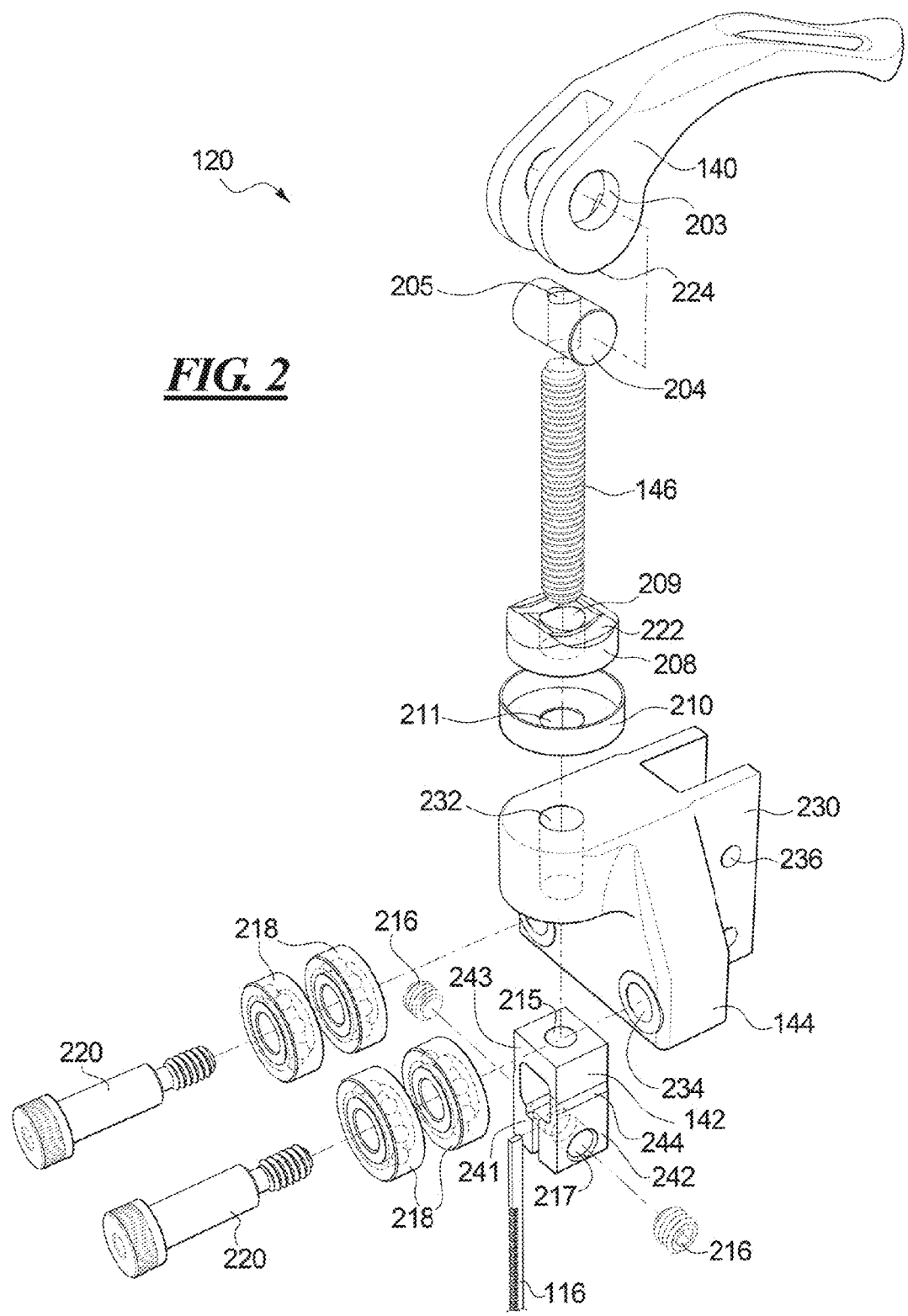

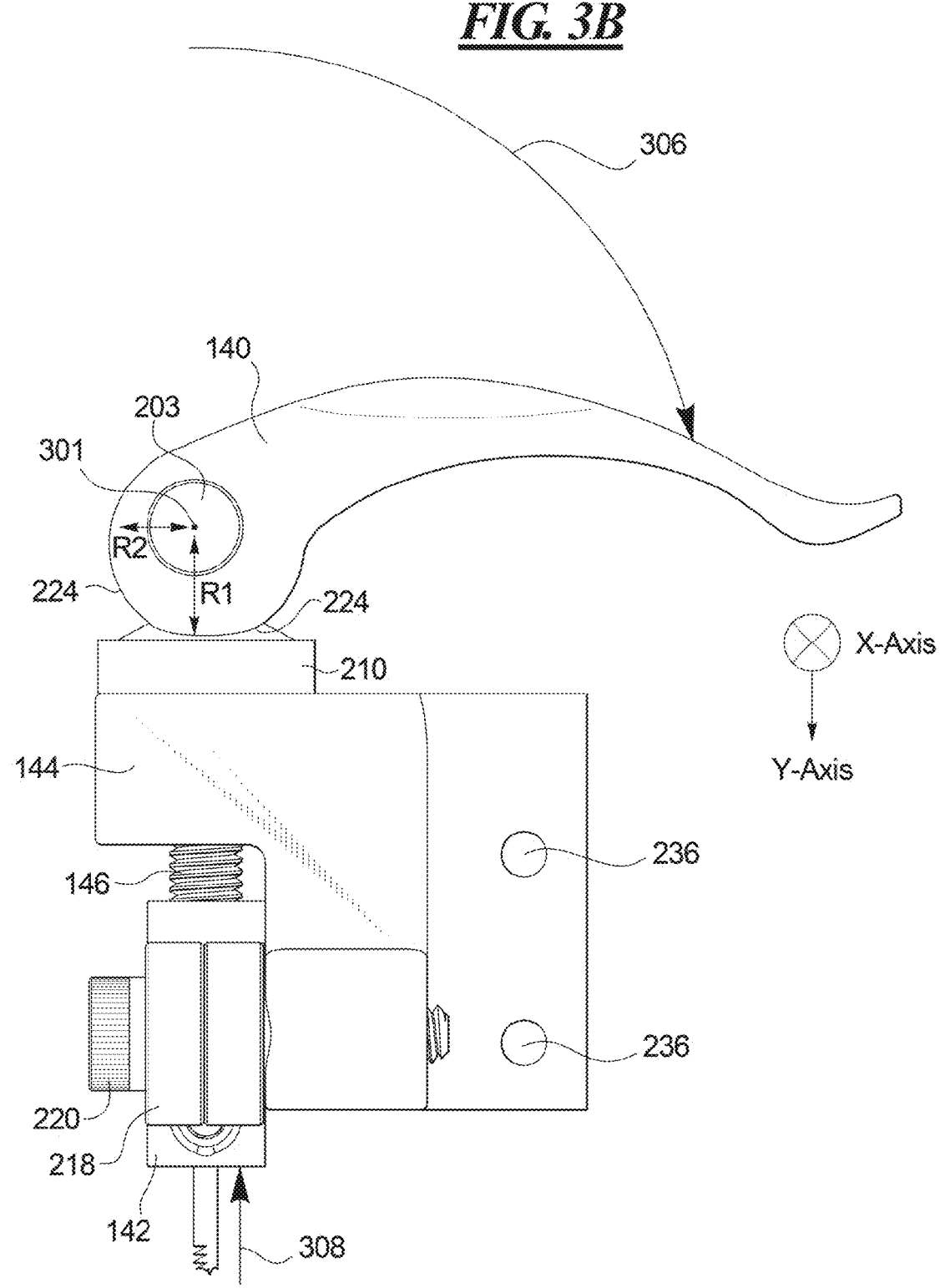

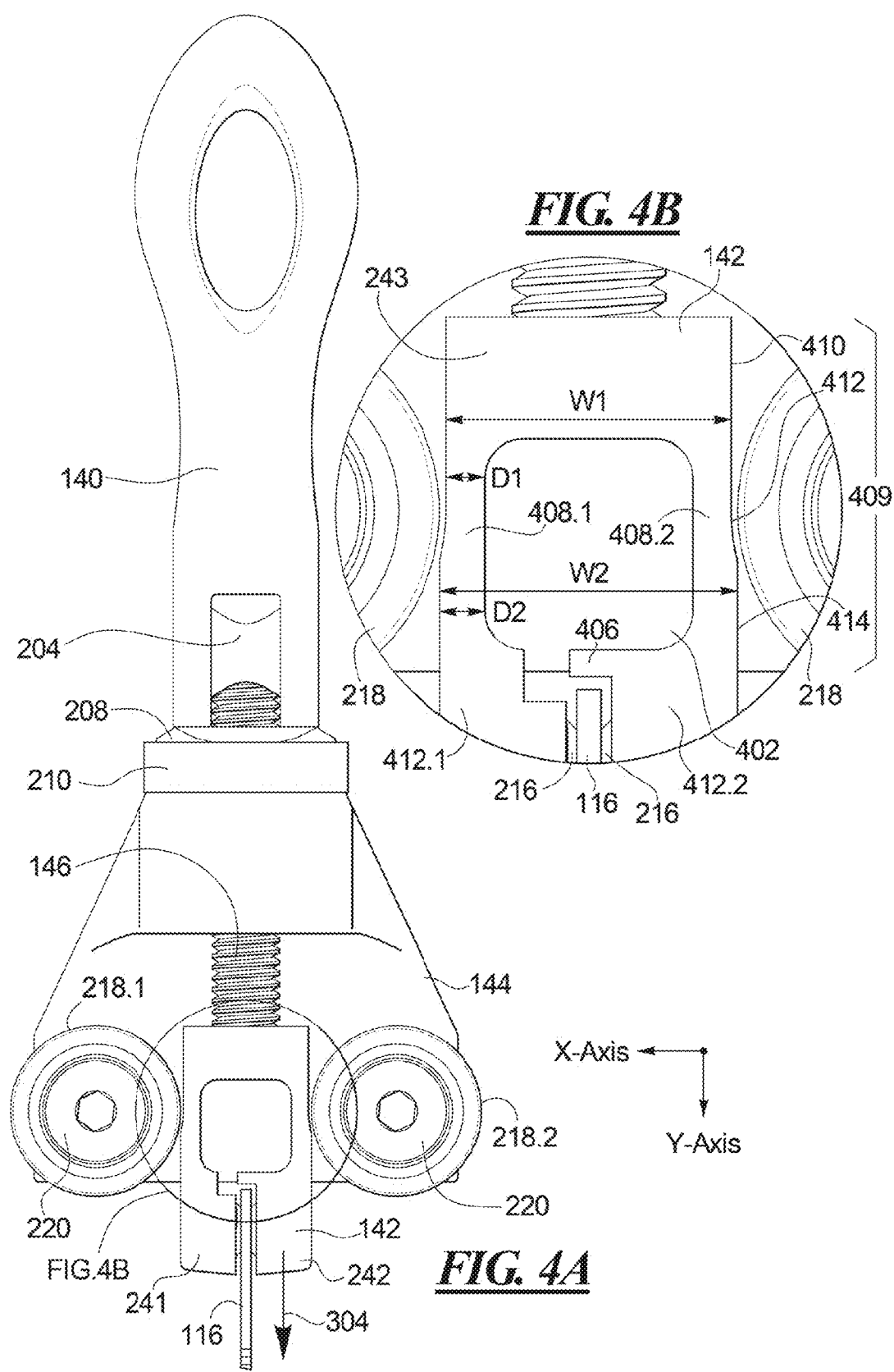

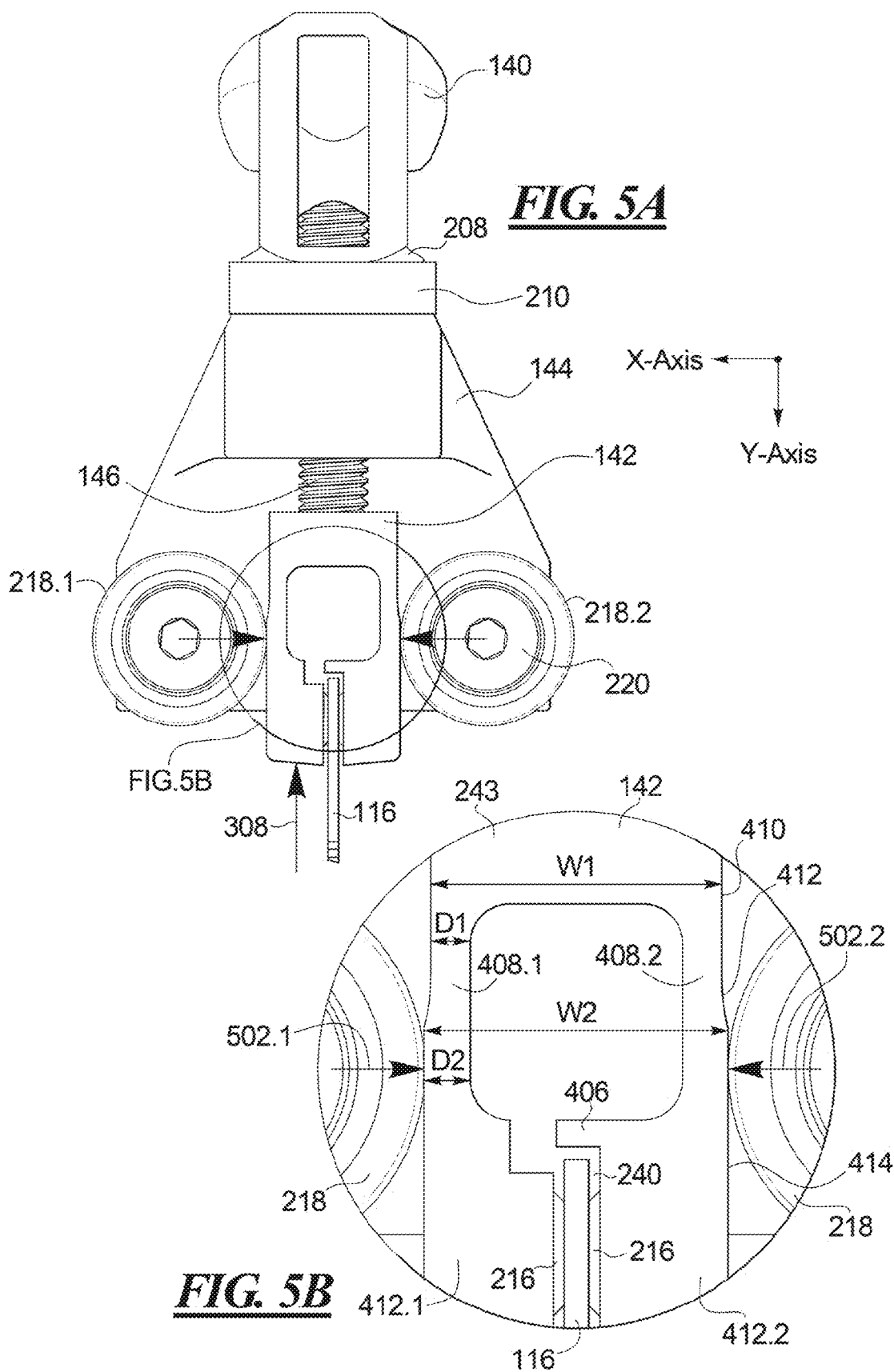

COMBINED BLADE CLAMP AND TENSIONER FOR SCROLL SAW

CROSS-REFERENCE TO RELATED APPLICATION

This application claims the benefit of U.S. Provisional Patent Application Ser. No. 62/325,165, filed Apr. 20, 2016, which is incorporated herein by reference.

BACKGROUND

Field

Embodiments described herein generally relate to a saw, including a scroll saw having a blade clamp to secure a cutting blade of the scroll saw.

Related Art

Scroll saws include first and second arms that hold a cutting blade and reciprocate in unison to move the cutting blade in a reciprocating motion as an object to be cut is brought into contact with the moving blade. In operation, the blade is under tension while being used. The blade is removable from and replaceable on the first and the second arms which hold the cutting blade.

Scroll saws may be used to cut wood, metal or other materials. A scroll saw blade is typically relatively fine compared to blades used in band saws or jigsaws, for example, permitting the scroll saw to be used to make intricate curved cuts in the material, such as to form scrollwork or other finely curved cuts. The blade may be removed from the arms of the scroll and placed through a pre-drilled starting hole in the material before remounting on the arms, allowing interior cuts to be made without requiring an entry slot to the interior cut.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 2 is an exploded perspective view of a blade clamp according to an exemplary embodiment of the present disclosure taken generally from the front, top, right side thereof.

FIG. 3B is a side elevational view showing an operation of the blade clamp of FIG. 2 in a second lever position according to an exemplary embodiment of the present disclosure.

FIG. 4A is a front elevational view showing an operation of the blade clamp of FIG. 2 in a first lever position according to an exemplary embodiment of the present disclosure.

FIG. 4B is an enlarged view of a portion of the blade clamp as indicated by circle FIG. 4B marked in FIG. 4A.

FIG. 5A is a front elevational view showing an operation of the blade clamp of FIG. 2 in the second blade position according to an exemplary embodiment of the present disclosure.

FIG. 5B is an enlarged view of a portion of the blade clamp as indicated by circle FIG. 5B marked in FIG. 5A.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Figure 1A:
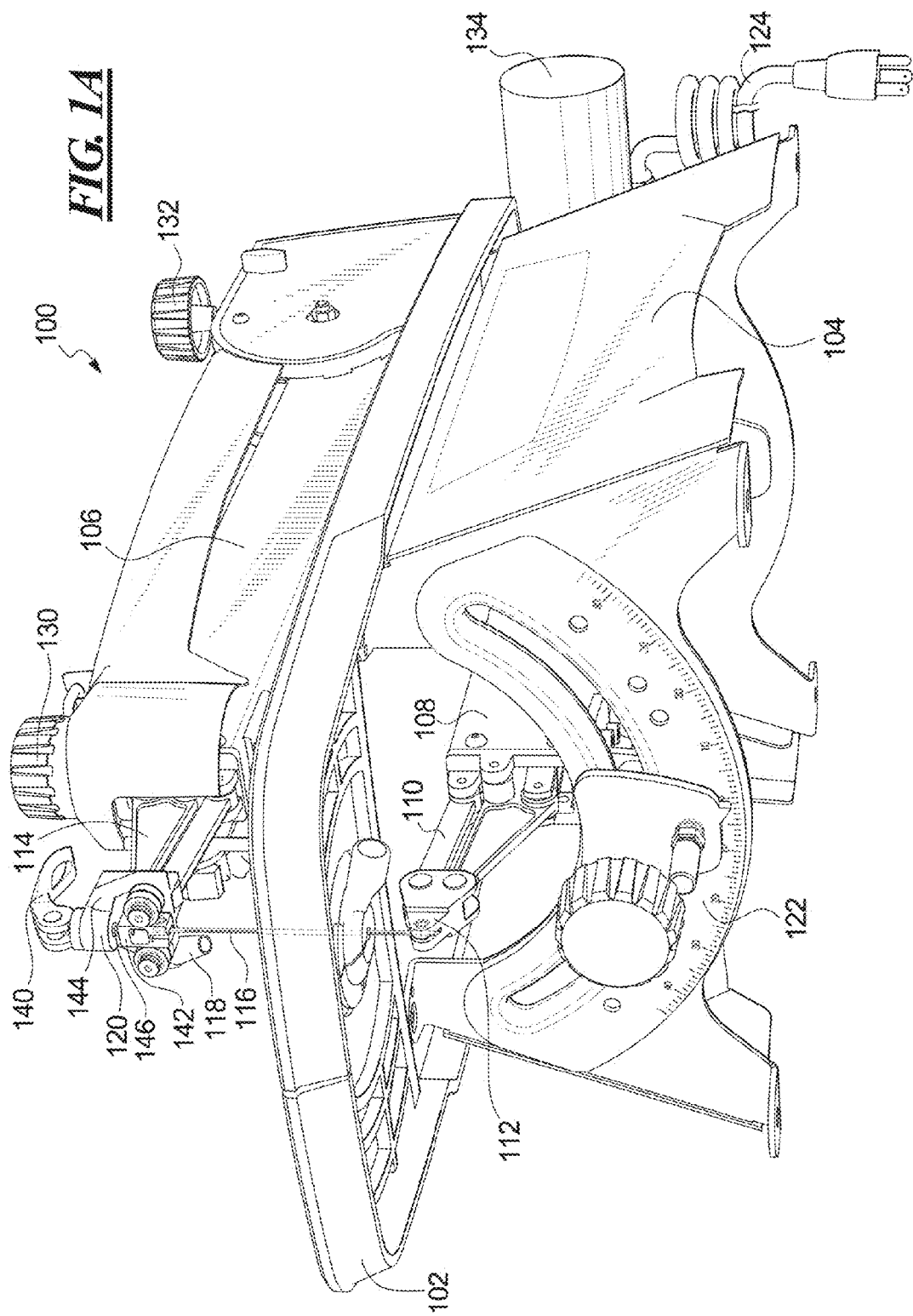
FIG. 1A is a front, bottom, right side view of a scroll saw according to an exemplary embodiment of the present disclosure.

FIG. 1A illustrates a scroll saw 100 according to an exemplary embodiment of the present disclosure.

The scroll saw 100 includes a worktable 102 mounted on a base 104. A cutting blade 116 extends through an aperture 117 (see FIG. 1B) of the worktable 102 and is secured between an upper blade clamp 120 and a lower blade clamp 112. As illustrated in FIG. 1A, the cutting blade 116 extends substantially vertically between the upper blade clamp 120 and the lower plate clamp 112. In an exemplary embodiment, the cutting blade 116 and the worktable 102 may be positioned substantially orthogonal to each other, but may be adjusted to other angles by the user as desired. For example, an angle of the cutting blade 116 can be adjusted with respect to the worktable 102 and/or an angle of the worktable can be adjusted with respect to the cutting blade 116. For example, a bevel adjustment 122 can be configured to adjust an angle of the worktable 102 with respect to the cutting blade 116 by tilting the worktable 102 as the bevel adjustment 122 moves along the semicircular bracket marked with angle indicia. In another configuration, the bevel adjustment 122 can be configured to adjust an angle of the cutting blade 116 by tilting the upper and lower blade clamps 120, 112 with respect to the worktable 102 as a bevel adjustment 122 moves along the semicircular bracket.

With continued reference to FIG. 1A, the upper blade clamp 120 is supported by an upper arm 114 and the lower blade clamp 112 is supported by a lower arm 110. In operation, the upper arm 114 and the lower arm 110 reciprocate in unison to move the cutting blade 116 along an axis formed between the upper blade clamp 120 and the lower blade clamp 112. For example, as illustrated in FIG. 1A, the cutting blade 116 is in a vertical arrangement and the reciprocation of the upper blade clamp 120 and the lower blade clamp 112 moves the cutting blade 116 in an up and down motion.

The upper arm 114 supports the upper blade clamp 120 on a first end of the upper arm 114. In an exemplary embodiment, the blade clamp 120 may include a head 144 that supports a clamp 142 that engages and secures the cutting blade 116. The blade clamp 120 can include a lever 140 that is configured to adjust the position of the clamp 142 based on the position of the lever 140. A second end of the upper arm 114 opposite the first end is connected to an upper support member 106. The upper support member 106 is further connected to a reciprocation mechanism (not shown) of a type that is known in the art and that is driven by a motor 134. Similarly, the lower support member 110 supports the lower blade clamp 112 on a first end of the lower support member 110. A second end opposite the first end is connected to a lower support member 108. The lower support member 108 is further connected to the reciprocation mechanism that is driven by the motor 134. The reciprocation mechanism may be any mechanism as would be understood by one of ordinary skill that is configured to move the support members 106 and 108 in a reciprocating motion. In operation, the reciprocation mechanism moves the support members 106 and 108 in a reciprocating motion which causes the upper arm 114 and the lower arm 110 to move in the reciprocating motion.

The scroll saw 100 can also include a dust blower 118 configured to expel air or other gas near a cutting zone of the cutting blade 116 to blow and remove waste (e.g. sawdust) generated by the cutting blade 116 as the cutting blade 116 cuts a workpiece such as a piece of wood. A vacuum or dust collecting system may be connected to collect dust and debris in certain embodiments. The scroll saw 100 can be powered by, for example, an electric power source (e.g. an AC or DC power outlet and/or DC battery) and can be connected to the electrical power source by a power cord 124. The power source is not limited to electric power sources and the scroll saw 100 can be powered by other power sources, such as steam or manpower through a crank or other means. Although a powered scroll saw is illustrated, the present blade clamp may be used on a variety of manual and powered saws.

In an exemplary embodiment, the scroll saw 100 can include one or more tension adjustments 130, 132 that can adjust the tension force applied to the cutting blade 116 by the blade clamps 120 and 112. The tension adjustments 130, 132 can adjust a distance between the blade clamp 120 and the lower blade clamp 112 to adjust for different blade lengths or to adjust the tension force applied to the cutting blade 116.

Figure 1B:
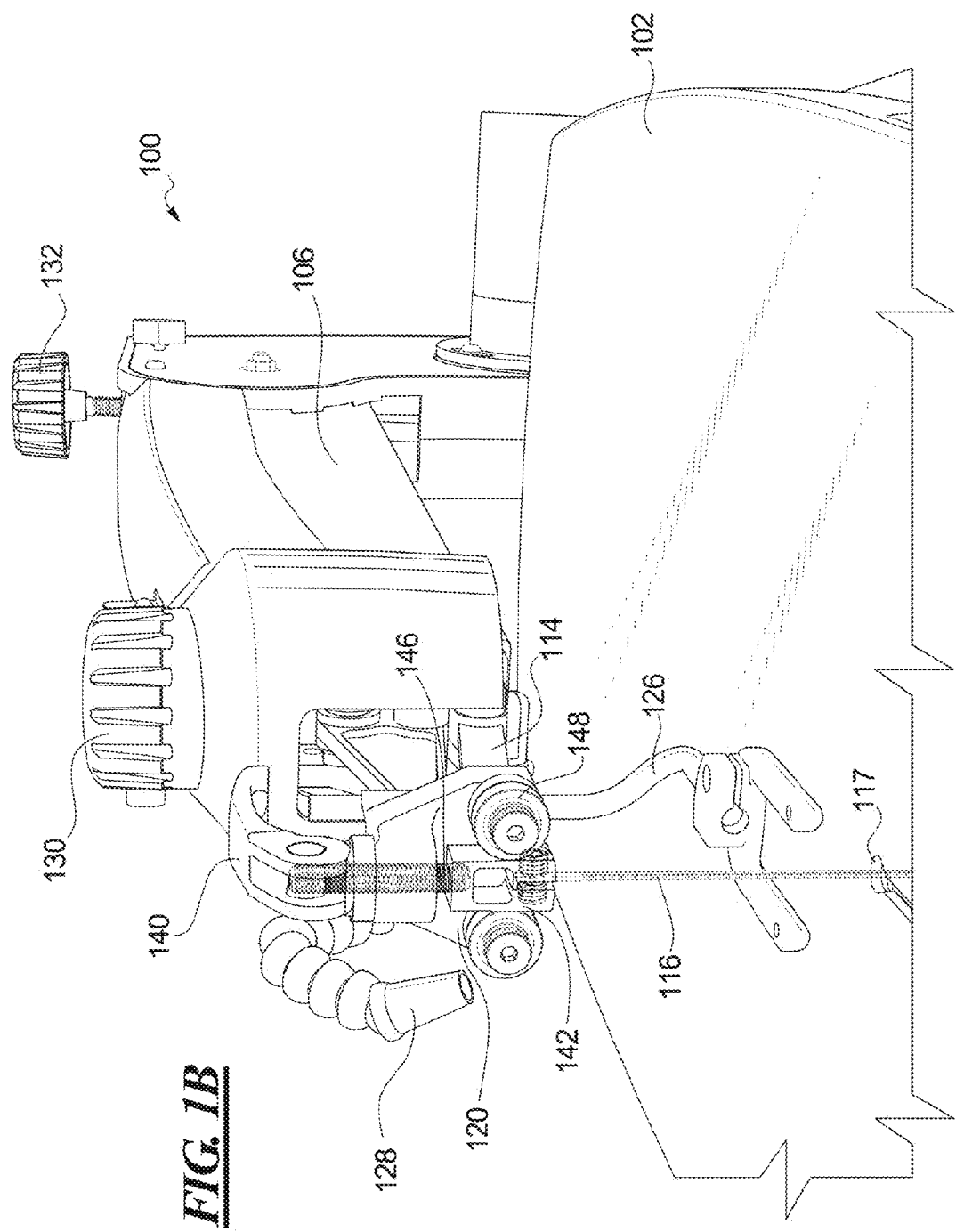
FIG. 1B is an enlarged fragmentary view from a front, top, right side of a scroll saw according to an exemplary embodiment of the present disclosure.

With reference to FIG. 1B, the scroll saw 100 can include a foot and arm 126 that can be lowered onto a workpiece to secure the workpiece on the worktable 102 and/or to serve as a location reference or guide. The foot and arm 126 includes an arm to which is attached a U-shaped foot that may have location marks on either side of the blade, as shown. In the enlarged view of FIG. 1B, the blade clamp 120 is shown, illustrating the components of the blade clamp 120 as mounted on the saw.

The dust blower 118 includes a nozzle 128 that directs a stream of air toward the cutting area. The nozzle 128 is mounted on a flexible hose and may be directed as desired or may be moved out of the way.

The cutting blade 116 is held in the clamp 142 by compression exerted on opposite sides of the clamp 142 to roller assemblies or compression member assemblies 148, depending on the position of the lever 140.

FIG. 2 illustrates an exploded view of the blade clamp 120 according to an exemplary embodiment of the present disclosure, for example, as may be mounted on the saw 100 in FIGS. 1A and 1B.

In an exemplary embodiment, the blade clamp 120 may include a head 144 that supports a clamp 142 which engages and secures the cutting blade 116. The blade clamp 120 may include a lever 140 that is configured to adjust the position of the clamp 142 based on the position of the lever 140. In operation, the lever 140 is moved between an open position and a closed position which corresponds with an open and closed position of the clamp 142. In an exemplary embodiment, the blade clamp 120 may be formed of metal, a metal compound, or a composite, but is not limited thereto. The composition of the blade clamp 120 can be any material or combination of materials as would be understood by one of ordinary skill in the relevant arts. Further, the composition of the blade clamp 120 can be selected to have sufficient tensile strength while allowing for the clamp 142 to be resiliently deformable as discussed below.

Although other embodiments are also possible, in an exemplary embodiment, the blade clamp 120 can include a cam follower 208 disposed on the head 144. The cam follower 208 can include a surface 222 that is configured to receive and engage with a surface 224 of the lever 140. The blade clamp 120 can further include a washer 210 disposed between the cam follower 208 and a top surface of the head 144. The washer 210 includes a cylindrical outer lip into which the cam follower fits and a central opening 211 through which the threaded connection member 146 extends. The washer 210 may allow the cam follower 208 to rotate about the top surface of the head 144 when, for example, the lever 140 is rotated. For instance, the distance between the blade clamp 120 and the lever 140 may be adjusted on the threaded connection member 146 as needed by rotating the threaded connection member 146 in the block 143 or the connection member 204 or both. In an exemplary embodiment, the surface 224 of the lever 140 is an eccentric cam surface 224 that engages the surface 222 of the cam follower 208. The eccentric cam surface 224 may be eccentric relative to an aperture 203. The cam follower 208 can also include an aperture 209 that is configured to receive a connection member (connector) 146 that connects the lever 140 with the clamp 142. In an exemplary embodiment, the connection member 146 has a cylindrical shape, but is not limited thereto. The connection member 146 may be threaded to permit adjustment of the distance between the lever 140 and the clamp 142.

In an exemplary embodiment, the connection member 146 can be, for example, a bolt, screw, rod, cable, or another fastener as would be understood by those skilled in the arts. The connection member 146 can be configured to engage and connect to the lever 140 via a connection member 204. The connection member 204 may be cylindrically shaped, but is not limited thereto, and can include an aperture 205 that receives and connects with the connection member 146. The connection member 146 may be threaded into the aperture or otherwise fastened thereto. The connection member 204 can be disposed in an aperture 203 of the lever 140 to connect the connection member 146 to the lever 140.

In an exemplary embodiment, the connection member 204 is rotatably disposed within the aperture 203 and the aperture 203 is offset or eccentrically disposed with respect to the eccentric cam surface 224. The eccentric position of the connection member 204 with respect to the surface 224 is further illustrated in FIGS. 3A and 3B and discussed in detail below. In operation, the eccentrically disposed connection member 204 causes the connection member 146 and the clamp 142 to move along the y-axis (FIGS. 3A-3B) as the lever 140 moves between the open and the closed positions. The aperture 203 can extend through the lever 140 along an axis of rotation 301 of the lever 140, and the connection member 204 can be disposed along the axis of rotation within the aperture 203. For example, as discussed in detail in with reference to FIGS. 3A and 3B, the lever 140 can be configured to rotate about the axis of rotation 301 when engaging with the surface 222 of the cam follower 208. The axis of rotation 301 may be parallel or substantially parallel to the x-axis extending into and out of the page.

In an exemplary embodiment, the aperture 205 of the connection member 204 can be configured to connect to the connection member 146 via a threaded connection. In this example, the aperture 205 of the connection member 204 can be a threaded aperture and the connection member 146 can have threads configured to mate with the threads of the connection member 204. Although FIG. 2 illustrates the connection member 146 having threads along its entire length, threads can be included on only a portion of the connection member 146, such as at the end of the connection member 146 that connects to the connection member 204. Further, the connection of the connection member 146 to the connection member 204 is not limited to a threaded connection and can include a welded, glued, or other fastening technique as would be understood by one of ordinary skill in the relevant art. Further, the connection of the connection member 146 with the connection member 204 can be fixed or allow for the connection member 146 to rotate with respect to the connection member 204.

In an exemplary embodiment, the head 144 includes an aperture 232 that is in registration with the aperture 209 of the cam follower 208. In this example, the connection member 146 can extend through the aperture 209 of the cam follower 208 through the aperture 232 of the head 144 to meet with and connect to the clamp 142. In this arrangement, the connection member 146 extends parallel or substantially parallel to the y-axis, and is configured to move along the y-axis in response to positional changes of the lever 140. In this example, movement of the lever 140 causes the connection member 146 to move along the y-axis (the vertical direction in FIG. 2), thereby causing the clamp 142 to also move along the y-axis. That is, operation of the lever 140 causes the connection member 146 to move up and down through the head 144 which causes the clamp 142 to move in an upward or downward direction (directions 304/308 in FIGS. 3A-3B).

In an exemplary embodiment, the clamp 142 can include an aperture 215 that is configured to receive and connect with the connection member 146. In this example, a first end of the connection member 146 engages and connects with the connection member 204 and the opposite end of the connection member 146 engages and connects with the aperture 215 of the clamp 142. The aperture 215 of the clamp 142 can be a threaded aperture and the connection member 146 can have threads configured to mate with the threads of the threaded aperture 215. The connection member 146 and the clamp 142 may be adjusted by threading the connection member further or less for into the aperture 215. Further, the connection of the connection member 146 to the clamp 142 is not limited to a threaded connection and can include a welded, glued, or other fastening technique as would be understood by one of ordinary skill in the relevant art. The connection of the connection member 146 with the clamp 142 can be fixed or allow for the connection member 146 to rotate with respect to the clamp 142.

In an exemplary embodiment, the lever 140 can be configured to be rotatable (e.g. twistable) about head 144. In this example, either the lever 140 is fixed to the end of the connector 146 connected to the lever 140 or the clamp 142 is fixed to the end of the connector 146 connected to the clamp 142. In operation, the pivoting rotation of the lever 140 causes the clamp 142 to move up or down along the y-axis. The range of the movement of the clamp 142 relative to the other elements of the blade clamp 102 may be adjusted for reasons which will be explained hereinafter. For example, if the connector 146 is fixed to the clamp 142, twisting the lever 140 about the connector 146 causes the connector 146 to move in the aperture 205 of the connection member 204 along, for example, the threads of the threaded connection, thereby adjusting the position of the clamp 142 along the y-axis. If the connector 146 is fixed to the lever 140, twisting the lever 140 causes the connector 146 to move in the aperture 215 of the clamp 142, thereby adjusting the position of the clamp 142 along the y-axis.

The clamp 142 can be configured to engage and secure cutting blades 116 of different thicknesses and sizes. In an exemplary embodiment, the clamp 142 can include a slot 240 that engages an end or near an end of the cutting blade 116. In this example, the slot 240 can be defined by the first and second gripping arms, 241, 242 that extend from a block 243 of the clamp 142. In an exemplary embodiment, the first and second, gripping arms 241, 242 are resiliently deformable and can be forced toward one another by one or more forces (e.g. forces 502 as represented by arrows in FIGS. 5A-5B, specifically the arrows 502.1 and 502.2) exerted on the first and the second gripping arms 241, 242 (see FIGS. 4A-5B). In this example, the first and second gripping arms 241, 242 can bend and move closer together to narrow the slot 240 in response to one or more forces (e.g. forces 502) applied to the exterior of the clamp 142, and return to a normal, resting position having a wider slot 240 after the force(s) are removed. In operation, when the first and second gripping arms 241, 242 are resiliently deformed toward one another, the first and second gripping arms 241, 242 can apply a clamping force on the cutting blade 116.

The first and second gripping arms 241, 242 can include one or more adjustable grip members 216 that engage the cutting blade 116. For example, the adjustable grip members 216 can include set screws configured to engage threaded bores 217 extending through each of the gripping arms 241 and 242. Adjusting the position of the adjustable grip members 216 adjusts the spacing between the adjustable grip members 216 within the slot 240. The adjustable grip members 216 can be used to increase or decrease the grip spacing for the cutting blade 116 within the slot 240. The inwardly directed ends of the adjustable grip members 216 may provide the grip surface for engaging the saw blade 116. The grip surface spacing may be adjusted to accommodate thicker or thinner saw blades 116 by adjusting the positions of the adjustable grip members 216 in the threaded bores 217.

One or both of the gripping arms 241 and 242 has a step or ramp 244 on an outwardly directed surface. The step or ramp 244 is the transition between a narrower portion of the clamp 142 at the upper end, relative to the figure, and a wider portion of the clamp 142 at the lower end, relative to the figure, at the free ends of the gripping arms 241 and 242.

In an exemplary embodiment, the blade clamp 120 can include one or more compression members 218 positioned adjacent to the clamp 142 and secured to the head 144 via one or more connectors 220, such as one or more bolts, screws, or other fasteners. The compression members 218 can include one or more bearings configured to rotate about a respective connector 220. The compression members 218 of the illustrated embodiment are rollers. A pair of rollers 218 is provided on each side of the clamp 142. In operation, the compression member(s) 218 can be configured to selectively apply pressure/force (e.g. force 502) to the clamp 142, including on one or more of the first and second gripping arms 241, 242 of the clamp 142 as the rollers roll over the ramp or step and onto the wider gripping arms 241 and 242. The compression member(s) 218 are configured to allow the clamp 142 to move between the compression member(s) 218 while applying the pressing force 502 to the first and second gripping arms 241, 242. In an exemplary embodiment, the clamp 142 can move between and along the compression members 218 while the compression members 218 rotate to facilitate the passing of the clamp 142 between the compression members 218.

The head 144 can further include one or more apertures 234 configured to receive and connect with respective connectors 220 on which the compression members 218 are mounted. In an exemplary embodiment, the apertures 234 can be threaded and configured to mate with a threaded portion of connectors 220, but are not limited to these fastening means. The head 144 can also include the connection members 230 shown as parallel plates having one or more apertures 236. The connection member(s) 230 can be configured to engage and connect to the upper arm 114, thereby connecting the head 144 to the upper arm 114 as illustrated in FIGS. 1A and 1B. For example, one or more connectors, such as screws, bolts, or other fastening means can be used to connect the connection members 230 to the upper arm 114. In an exemplary embodiment, one or more connectors can be inserted through apertures 236 and secured to the upper arm 114 to facilitate the connection.

Figure 3A:
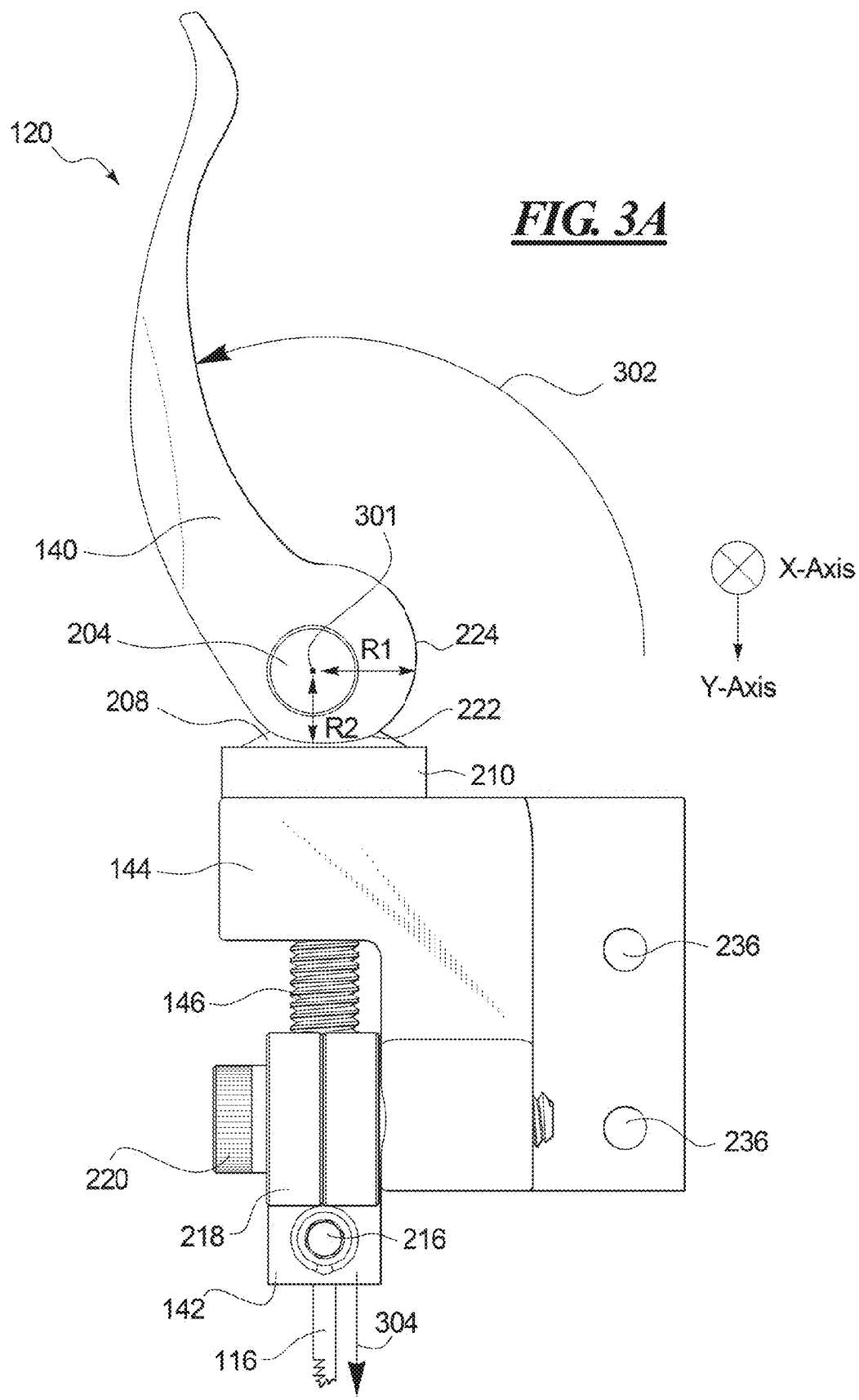
FIG. 3A is a side elevational view showing an operation of the blade clamp of FIG. 2 in a first lever position according to an exemplary embodiment of the present disclosure.

FIGS. 3A-5B illustrates the operation of the blade clamp 120 of FIG. 2 according to exemplary embodiments of the present disclosure. FIGS. 3A, 4A and 4B illustrate the blade clamp 120 with the lever 140 having been moved from a closed position to an opened position. FIGS. 3B, 5A and 5B illustrate the blade clamp 120 with the lever 140 having been moved from the opened position to the closed position.

With reference to FIG. 3A, the lever 140 is shown in the open position and has been moved from the closed position to the open position along the direction indicated by an arrow 302. In operation, as the lever 140 moves along the opening direction 302, the eccentric cam surface 224 of the lever 140 may engage the surface 222 of the cam follower 208, allowing the connection member 146 to move in a downward direction 304 to open the clamp and release the blade, as will be described in greater detail. The direction 304 is parallel or substantially parallel to the y-axis, as indicated in the drawing.

The movement of the connection member 146 in the downward direction 304 causes the clamp 142 to also move in the downward direction 304. The clamp 142 passes between compression members 218.1 and 218.2 positioned at opposite sides of the clamp 142 (see FIGS. 4A and 4B).

In an exemplary embodiment, the eccentric cam surface 224 is a result of the aperture 203 (and the connection member 204) being eccentrically located within an end portion of the lever 140 such that the cam surface 224 varies in distance from the axis of rotation of the lever 140. For example, the cam surface 224 is shaped so that the distance from the axis of rotation to the cam surface 224 changes gradually from a greater distance R1 to a lesser distance R2.

In this example, as the lever 140 is moved between the open and closed positions, the clamp 142 can move a distance along the direction 304/308 that is approximately equal to the difference between the distances R2 and R1. This is but one example, to which the present apparatus is not limited.

In an exemplary embodiment, one or more portions 410, 412, 414 of the outer surface 409 of the clamp 142 can include a ramped and/or curved surface or be otherwise shaped. In this example, the clamp 142 has an increasing width as the distance from the block 243 of the clamp 142 increases. For example, the clamp 142 has a width W1 near the block 243 of the clamp 142 and a width W2 at the opposite end of the clamp 142, where the width W2 is greater than the width W1. In an exemplary embodiment, one or both opposite sides of the clamp 142 that contact the compression members 218 can have a ramped and/or curved surface. In embodiments in which two sides have ramped and/or curved surfaces, the degree of the ramp/curve can be the same or different for the two sides.

In an exemplary embodiment, the portion 410 of the outer surface 409 is straight and parallel to the y-axis, the portion 412 is ramped or curved such that the width of the clamp 142 increases as the distance from the block 243 increases, and the portion 414 is straight and parallel to the y-axis. In this arrangement, clamp 142 has a constant width along portions 410 and 414, and an increasing width along portion 412. In this example, the portion 412 can correspond to step or ramp 244 shown in FIG. 2. In certain embodiments, the length of the portion 412 or step or ramp 244 (the distance from the constant width portion 410 to the constant width portion 414) is less than the difference between the distances R1 and R2. This permits the rotation of the lever 140 to move the clamp 142 between the portions 410 and 414 over the portion 412 or ramp 244.

In this embodiment, the compression members 218 and connectors 220 cause a first constant force on the clamp 142 when positioned along portion 414, a decreasing force of the clamp 142 when positioned along portion 412, and a second constant force on the clamp 142 when positioned along portion 410, where the first constant force is greater than the second constant force. In certain examples, the force by the compression members 218 on the clamp 142 at portion 410 may be zero or may be small. In this example, when the clamp 142 is moved over the portion 412 the force on the clamp 142 increases or decreases depending on the direction of travel of the clamp 142. The movement of the lever 140 from the closed position to the open position (movement along direction 302 shown in FIG. 3A) causes a constant clamping force and a decreasing tension force on the blade 116 when the compression members 218 move along portion 414, and causes a decreasing clamping force and a decreasing tension force on the blade 116 when the compression members 218 move along portion 412. When the lever 140 is moved further to bring the portion 410 between the compression members 218, the clamping force on the blade 116 is released. With the clamping force released, the blade 116 may be removed or repositioned.

In this embodiment, the adjustable grip members 216 have been adjusted to securely hold the blade 116 within the clamp 142 in the closed position (i.e., the blade 116 is held in position within the clamp 142), and the movement of the lever 140 from the closed position to the open position causes a decreasing tension force on the blade 116 and release of the blade 116 when the compression members 218 move to the portion 410.

In other embodiments, the clamp 142 may include more or fewer shaped portions of the outer surface 409, and the straight and ramped/curved configurations of theses portions can be any combination as would be understood by one of ordinary skill in the relevant arts. For example, the outer surface 409 may include two portions: a straight portion followed by a ramped/curved portion, or a ramped/curved portion followed by a straight portion; a single curved/ramped portion; multiple portions in any arrangement or another configuration as would be understood by one of ordinary skill in the relevant arts.

In an exemplary embodiment, the first member 241 and/or the second member 242 can have increasing widths as the first and/or second gripping members 241, 242 extend outward from the block 243. For example, a sidewall 408.1 of the first member 241 and/or a sidewall 408.2 of the second member 242 can have a width D1 near the block 243 and a width D2 at the opposite end of the member 241 and/or member 242, where width D2 is greater than width D1.

As the clamp 142 moves between the compression members 218 in the direction 304, the force exerted on the clamp 142 by the compression members 218 decreases, thereby decreasing a clamping force exerted by the clamp 142 on the cutting blade 116 as the first and second gripping members 241, 242 resiliently return to a normal, non-deformed position (position illustrated in FIGS. 4A and 4B). In this example, the first and second gripping members 241, 242 of the clamp 142 separate as the force exerted on the clamp 142 by the compression members 218 decreases due to the smaller width W1 of the clamp 142 positioned between the compression members 218. Further, the slot 240 expands as the first and second gripping members 241, 242 move outward along the x-axis, which can be substantially orthogonal or orthogonal to the y-axis. As the gripping member moves to release the gripping force on the blade, the tension on the cutting blade 116 decreases as the clamp 142 moves in the downward direction 304 (along the y-axis) towards the lower clamp 112.

The movement of the lever 140 in the direction 302 both releases the tension on the blade and releases the grip on the blade. A user may release the blade tension and blade grip with one hand, for example, while the other hand holds the now released blade.

With reference to FIG. 3B, the lever 140 has been moved from the open position along the direction of the arrow 306 to the illustrated closed position (see also FIGS. 5A and 5B). In operation, as the lever 140 moves along the direction 306, the eccentric cam surface 224 of the lever 140 engages the surface 222 of the cam follower 208 so that the axis of rotation of the lever is moved upward, causing the connection member 146 to move in an upward direction 308. The direction 308 is parallel or substantially parallel to the y-axis.

As discussed above, the eccentric cam surface 224 can be created by the aperture 203 (and the connection member 204) being eccentrically located within the end of the lever 140 such that the distance R1 is greater than the distance R2 in an exemplary embodiment. In this example, the clamp 142 can move a distance along the direction 304/308 that is approximately the difference between the distances R2 and R1 as the lever is moved between the open position (FIG. 3A) and closed position (FIG. 3B).

The movement of the connection member 146 in the upward direction 308 causes the clamp 142 to also move in the upward direction 308. The clamp 142 moves between compression members 218.1 and 218.2 positioned at opposite sides of the clamp 142 (see FIGS. 5A and 5B). In exemplary embodiments where one or more portions 410, 412, 414 of the outer surface 409 of the clamp 142 have a ramped and/or curved surface, the clamp 142 has an increasing width as the distance from the block 243 of the clamp 142 increases. For example, the clamp 142 has a width W1 near the block 243 of the clamp 142 and a width W2 at the opposite end of the clamp 142, where the width W2 is greater than the width W1.

As the clamp 142 passes through compression members 218 in the direction 308, due to the increasing width of the of the clamp 142, the force 502 exerted on the clamp 142 by the compression members 218 increases, thereby initiating or increasing a clamping force exerted by the clamp 142 on the cutting blade 116 as the first and second gripping members 241, 242 resiliently deform inward against the cutting blade 116 to a clamped position (position illustrated in FIGS. 5A and 5B). In this example, the first and second gripping members 241, 242 of the clamp 142 bend inward as the force 502 exerted on the clamp 142 by the compression members 218 increases due to the larger width W2 of the clamp 142 positioned between the compression members 218. In this example, the slot 240 contracts as the first and second gripping members 241, 242 move inward along the x-axis.

As the clamping or gripping force on the blade is increased, the tension on the cutting blade 116 also increases as the clamp 142 moves in the upward direction 308 (along the x-axis) away from the lower clamp 112. The gripping members 216 have been adjusted, for example by the user, to grip the blade 116 as the compression members 218 roll over the ramp 412. Once the blade 116 is gripped, further movement of the lever 140 applies tension to the blade and then increases the tension on the blade as the compression members 218 move along the linear portion 414.

In this embodiment, the compression members 218 cause the second constant force on the clamp 142 when positioned along portion 410, an increasing force on the clamp 142 when positioned along portion 412, and the first constant force on the clamp 142 when positioned along portion 414, where the first constant force is greater than the second constant force. In this example, the force when the clamp 142 is positioned along portion 412 increases from the second constant force to the first constant force as the clamp 142 moves in the direction 308. Movement of the lever 140 from the open position to the closed position (movement along the direction 306 shown in FIG. 3B) initiates and then increases a clamping force on the blade and initiates and then increases a tension force on the blade 116 when the compression members 218 move along portion 412. Further movement of the lever 140 results in application of a constant clamping force and an increasing tension force on the blade 116 as the compression members 218 move along portion 414. In this embodiment, if the adjustment members 216 are adjusted to securely hold the blade 116 within the clamp 142 (i.e., the blade 116 is held in position within the clamp 142), the movement of the lever 140 from the open position to the closed position causes an increasing tension force on the blade 116 when the compression members 218 move along portion 410.

A user may hold the blade in one hand to position the blade in the clamp and may move the lever 140 from the open position to the closed position to both grip the blade in the blade clamp and apply the desired tension to the blade with one movement by one hand. The user may easily remove and replace the blade with a simple, one lever adjustment. The user may change blades or reposition the blade as desired. As a result of an easily released and easily mounted blade, a scroll saw having the present blade mount may be used to cut workpieces having one or more interior cuts that are not accessible by an entrance slot from the edge of the workpiece. In one example, a user may release the blade, pass one end of the blade through a starter hole in the workpiece and then remount the blade in the saw using the single lever mounting. With the blade extending through the workpiece, the saw may be operated to cut a shape that is within the workpiece without the cut extending to the edge of the workpiece. The user may then release the blade and remove the blade the workpiece or may move the blade to another starter hole for another interior cut. Multiple such interior cuts may be made in a workpiece by mounting and releasing the blade for each interior cut. Such a task would be tedious and time consuming with a saw requiring separate mounting and tensioning of the blade, particularly if the mounting and tensioning requires tools such as wrenches and screwdrivers to operate fasteners or other devices that either hold the blade or tension the blade. The single-handed, tool-less, combined gripping and tensioning operation of the present blade clamp simplifies the process. Intricate workpiece designs are possible with less effort and time by the user.

In an exemplary embodiment, with reference to FIGS. 2 and 4B, the clamp 142 includes the block 243 and first and second gripping members 241, 242. The first gripping member 241 includes a sidewall portion 408.1 connected to a clamping portion 412.1. Similarly, the second gripping member 242 includes sidewall portion 408.2 connected to a clamping portion 412.2. In this example, the block 243, sidewall portions 408, and clamping portions 412 define an aperture 402 that extends through the clamp 142.

In an exemplary embodiment, one or more of the clamping portions 412 includes a lip 406 that is extends across the slot 240 and is configured to prevent the cutting blade 116 from extending into the aperture 402, for example, when mounting the cutting blade 116 in the slot 240. In an exemplary embodiment, the clamp 142 is substantially C-shaped or U-shaped.

In exemplary embodiments, the lever 140 can be replaced by another adjustment device configured to raise or lower the connection member 146 along the y-axis. For example, the lever 140 can be replaced with, for example, a handle fixed to the connection member 146, a nut, a wingnut, a handle threaded onto the connection member 146, or another adjustment device as would be understood by one of ordinary skill in the relevant arts.

In these examples, either the adjustment device is fixed to the end of the connector 146 connected to the adjustment device or the clamp 142 is fixed to the end of the connector 146 connected to the clamp 142, or both. In operation, the rotation of the adjustment device causes the clamp 142 to move up or down along the y-axis. For example, if the connector 146 is fixed to the clamp 142, the rotation of the adjustment device causes the connector 146 to further enter an aperture of the adjustment device, thereby adjusting the position of the clamp 142 along the y-axis. If the connector 146 is fixed to the adjustment device, the rotation of the adjustment device causes the connector 146 to further enter the aperture 215 of the clamp 142, thereby adjusting the position of the clamp 142 along the y-axis.

An exemplary method of the scroll saw 100 will be described below with reference to FIGS. 1A to 5B. In an exemplary embodiment, to mount the cutting blade 116 on the scroll saw 100, the lower end of the cutting blade 116 is inserted through aperture 117 and engages and is secured to the lower clamp 112. The upper end of the cutting blade 116 is then placed in the slot 240. The lever 140 is then moved from the open position to the closed position in the direction 306, which causes clamp 142 to move from the open to the closed position of the clamp 142. As the clamp 142 moves to the closed position, the clamping portions 412 provide a clamping force on the blade 116 (e.g. forces 502 in FIGS. 5A-5B) and/or the clamp 142 provides a tension force on the blade 116 as the clamp moves in the direction 308. To remove the cutting blade 116, the reverse operations can be performed.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

What is claimed is:

1. A blade clamp of a saw operable to secure a cutting blade in the saw, the blade clamp comprising:
   a clamp having first and second gripping members configured to hold the cutting blade between the first and the second gripping members;
   a connection member having a first end connected to the clamp and having a second end;
   a lever connected to the second end of the connection member, the lever being operable to move between first and second lever positions; and
   a head that receives the connection member that extends through an aperture of the head, the connection member being configured to move along a first axis through the aperture of the head and move the clamp along the first axis as the lever is moved from the first lever position to the second lever position,
   wherein the first and the second gripping members of the clamp are configured to clamp the cutting blade along a second axis orthogonal to the first axis and to apply tension to the cutting blade as the lever is moved from the first lever position to the second lever position.

2. The blade clamp of claim 1, wherein the lever comprises an eccentric cam surface that is configured to engage a cam follower, the connection member being configured to move along the first axis through the aperture of the head and move the clamp along the first axis based on a position of the eccentric cam surface with respect to the cam follower.

3. The blade clamp of claim 2, wherein the cam follower is disposed on the head and the connection member extends through an aperture of the cam follower to connect to the lever.

4. The blade clamp of claim 1, wherein the clamp is configured to apply an increasing clamping force on the cutting blade and an increasing tension force on the cutting blade as the clamp moves along the first axis in response to the lever being moved from the first lever position to the second lever position.

5. The blade clamp of claim 4, wherein the clamping force is along the second axis and the tension force is along the first axis.

6. The blade clamp of claim 1, wherein the head comprises first and second compression members that are configured to apply respective forces on the first and second gripping members of the clamp as the clamp moves along the first axis to cause the first and the second gripping members of the clamp to clamp the cutting blade.

7. The blade clamp of claim 6, wherein the first and second gripping members of the clamp have respective ramped surfaces that engage the first and the second compression members, the respective ramped surfaces causing the respective forces on the first and the second gripping members to increase as the clamp moves along the first axis in response to the lever being moved from the first lever position to the second lever position.

8. The blade clamp of claim 1, wherein the cutting blade extends along the first axis.

9. A scroll saw having a cutting blade, the scroll saw comprising:
   a base supporting a worktable and a motor that is configured to move the cutting blade along a first axis;
   a blade clamp including:
     a clamp having first and second gripping members configured to hold a first end of the cutting blade between the first and the second gripping members;
     a connection member connected to the clamp;
     a lever connected to the clamp by the connection member, the lever being configured to move between first and second lever positions; and
     a head that receives the connection member that extends through an aperture of the head, the connection member being configured to move along the first axis through the aperture of the head and move the clamp along the first axis as the lever is moved from the first lever position to the second lever position,
    wherein the first and the second gripping members of the clamp are configured to clamp the cutting blade along a second axis orthogonal to the first axis and to apply tension to the cutting blade along the first axis as the lever is moved from the first lever position to the second lever position; and
   a lower clamp configured to hold a second end of the cutting blade opposite the first end.

10. The scroll saw of claim 9, wherein the lever comprises an eccentric cam surface that is configured to engage a cam follower, the connection member being configured to move along the first axis through the aperture of the head and move the clamp along the first axis based on a position of the eccentric cam surface with respect to the cam follower.

11. The scroll saw of claim 10, wherein the cam follower is disposed on the head and the connection member extends through an aperture of the cam follower to connect to the lever.

12. The scroll saw of claim 9, wherein the clamp is configured to apply an increasing clamping force on the cutting blade and an increasing tension force on the cutting blade as the clamp moves along the first axis in response to the lever being moved from the first lever position to the second lever position.

13. The scroll saw of claim 12, wherein the clamping force is along the second axis and the tension force is along the first axis.

14. The scroll saw of claim 12, wherein the clamp and the lower clamp separate as the clamp moves along the first axis.

15. The scroll saw of claim 9, wherein the head comprises first and second compression members that are configured to apply respective forces on the first and second gripping members of the clamp as the clamp moves along the first axis to cause the first and the second gripping members of the clamp to clamp the cutting blade.

16. The scroll saw of claim 15, wherein the first and second gripping members of the clamp have respective ramped surfaces that engage the first and the second compression members.

17. The scroll saw of claim 9, wherein the cutting blade extends along the first axis between the clamp and the lower clamp.

18. A blade clamp of a saw operable to secure a cutting blade in the saw, the blade clamp comprising:
   a clamp having first and second gripping members configured to hold the cutting blade between the first and the second gripping members;
   a lever including an eccentric cam surface, the lever being connected to the clamp by a connection member and configured to move between first and second lever positions;
   a head having a cam follower that is configured to engage the eccentric cam surface, the head receiving the connection member that extends through an aperture of the head, wherein the connection member is configured to move along a first axis through the aperture of the head and move the clamp along the first axis based on the engagement of the eccentric cam surface with the cam follower as the lever is moved from the first lever position to the second lever position; and
   first and second compression members disposed on the head that are configured to apply respective forces on the first and second gripping members of the clamp as the clamp moves along the first axis to cause the first and the second gripping members of the clamp to clamp the cutting blade, the first and second gripping members of the clamp having respective ramped surfaces that engage the first and the second compression members,
   wherein the respective ramped surfaces cause the respective forces on the first and the second gripping members to increase as the clamp moves along the first axis in response to the lever being moved from the first lever position to the second lever position, and, as the lever is moved from the first lever position to the second lever position, the first and the second gripping members of the clamp are configured to: clamp the cutting blade along a second axis orthogonal to the first axis based on the increasing respective forces on the first and the second gripping members, and apply tension to the cutting blade based on the movement of the clamp along the first axis.

* * * * *